(12) United States Patent
Garvin

(10) Patent No.: US 10,027,099 B1
(45) Date of Patent: Jul. 17, 2018

(54) SQUARE TO OCTAGON ELECTRICAL ADAPTER FOR A SQUARE ELECTRICAL JUNCTION BOX

(71) Applicant: Barton L. Garvin, Western Springs, IL (US)

(72) Inventor: Barton L. Garvin, Western Springs, IL (US)

( * ) Notice: Subject to any disclaimer, the term of this patent is extended or adjusted under 35 U.S.C. 154(b) by 0 days.

(21) Appl. No.: 15/410,484

(22) Filed: Jan. 19, 2017

(51) Int. Cl.
 *H02G 3/08* (2006.01)
(52) U.S. Cl.
 CPC .................................. *H02G 3/081* (2013.01)

(58) Field of Classification Search
 CPC ........................................................ H02G 3/081
 USPC ........................................................ 174/66, 50
 See application file for complete search history.

(56) References Cited

U.S. PATENT DOCUMENTS 5,931,325 A * 8/1999 Filipov .................. H02G 3/081
 174/57

* cited by examiner

*Primary Examiner* — Dhirubhai R Patel
(74) *Attorney, Agent, or Firm* — David G. Rosenbaum; Benjamin D. Rotman; Rosenbaum IP, P.C.

(57) ABSTRACT

The present invention is a square to octagon adapter for a square electrical junction box.

16 Claims, 4 Drawing Sheets

SQUARE TO OCTAGON ELECTRICAL ADAPTER FOR A SQUARE ELECTRICAL JUNCTION BOX

BACKGROUND OF THE INVENTION

The present invention generally relates to adapters and device rings for electrical junction boxes. More particularly, the present invention relates to an adapter that can be used to adapt a square electrical junction box to accommodate an electrical device having an alternative configuration, such as, for example, an octagonal or circular electrical device.

Junction boxes are used to harness electrical wiring from a circuit breaker and further relay that electrical wiring to electrical devices including but not limited to power outlets, switches, thermostats, smoke detectors, and lighting fixtures such as wall sconces or ceiling lights. Junction boxes are typically mounted onto a wall stud or ceiling joist prior to placing drywall or they are added during renovation if an additional electrical device is required. Junction boxes come in various geometric shapes such as square, rectangular, circular, and octagonal. An installer chooses a particular shaped junction box depending on the particular application of the project. For example, a square shaped junction box may be particularly useful to house two switching devices or a circular junction box may be used to save space inside a wall and mount a circular electrical apparatus such as smoke detector.

Cover plates and device rings are used in conjunction with junction boxes to secure the electrical apparatus being installed to the junction box. A cover plate or device ring is typically coupled to an exposed face of the junction box that permits the electrician or user to access the wiring contained within the junction box. Cover plates and device rings typically are commercially available in the same shapes as exposed face of the junction boxes and are designed to match the shape of the corresponding junction box.

In the process of a home or building renovation or remodel, the property owner may want to change the currently installed electrical apparatuses or fixtures in a particular room. One of the issues that arises during this process is that the junction box currently installed behind the wall is of a different shape than the device ring or fixture plate of the new apparatus. It is tedious time consuming and expensive process to remove the existing junction box and install the proper shaped junction box and as such, adapters have been created to accommodate different shaped boxes and device. An example of this would be during a remodel the property owner may want to change thermostats from a rectangular thermostat to a circular thermostat. In this example, the existing the junction box is square shaped and the thermostat requires a circular shaped junction box to have the best cosmetic appearance. In this case, a square to circular adapter can be mounted onto the square junction box and the square portion can be covered with drywall. The adapter then provides the thermostat a cosmetically appealing circular mounting base.

Most adapters currently in the prior art are square to circular. The circular, often raised portion of the plate/ring/cover is substantially smaller in diameter than the square box opening it is being mounted to. Due to this limitation, installers often need to purchase additional mounting straps and plates in order for the fixtures to be properly secured to the in wall junction box. Tremendous field modifications are required with the current square to round rings because they provide extremely limited area for wiring and fixture protrusions/voltage adapters to be mounted inside of an electrical junction box. Additionally many electrical devices and fixtures exist with octagonal mounting plates and the currently existing square to circular adapters cannot accommodate the octagonal mounting plate.

The present invention addresses the issues of limited cutout space on current adapters while providing an appropriate adapter for device with octagonal mounting plates to eliminate the need to change in wall junction boxes or make on job extra modifications to install the device.

SUMMARY OF THE INVENTION

In view of the above, a square to octagon adapter is provided such that a square junction box can be used to accommodate a round or octagonal mounting plate or device while maximizing the usable area of the existing square junction box.

In one aspect, the square to octagon adapter comprises a generally square baseplate with an octagonal shaped opening. The octagonal shaped opening is configured such that at least four sides of the octagonal shaped opening run parallel to the four sides of the baseplate. The baseplate additionally comprises at least two angled slots disposed in opposite diagonal corners configured to accommodate a screw or mechanically similar fastener or mating mechanism. Further, the baseplate additionally comprises at least two flanges extending from the baseplate into the octagonal shaped opening from opposite sides of the octagonal shaped opening. The at least two flanges are configured to receive screws or similar fasteners or mechanical mating mechanisms to accommodate a complimentary mounting plate or electrical device.

In another aspect of the invention the baseplate additionally comprises a wall projecting normal to the baseplate at least partially surrounding the octagonal shaped opening. In this aspect of the invention, the at least two flange members may be configured to extend from the wall into the octagonal shaped opening.

In another aspect of the invention, the octagonal shaped opening is configured to have adjacent sides with equal lengths.

In another aspect of the invention, the octagonal shaped opening is configured to have adjacent sides alternating between a first length and a second length where the first length is longer than the second length. In this aspect, the sides of the octagonal shaped opening with the first length are configured to run parallel with respective sides of the outer perimeter of the baseplate.

In another aspect of the invention, the square to octagon adapter includes locking mechanism to help prevent screws coupling the square to octagon adapter to the electrical junction box from backing out once the screws are tightened.

In yet another aspect of the invention, a system includes a square electrical junction box, a square to octagon adapter, and an electrical device.

In yet another aspect of the invention, a method for adapting a square electrical junction box for a round or octagonal electrical device is described.

It is to be understood by a person of skill in the art that the term "octagonal shaped" refers to the traditional definition of an octagon i.e. a plane figure with eight straight sides and eight angles, as well as a plane figure with four straight sides interconnected by four radial members generally forming an eight sided figure resembling an octagon.

It is to be understood by a person of skill in the art that the term "generally square shaped" refers to the traditional definition of a square i.e. a plane figure with four equal straight sides and four right angle, as well as a plane figure with four equal length sides interconnected by four radial members generally forming a four sided figure representing a square.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE PREFERRED EMBODIMENTS

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1A:
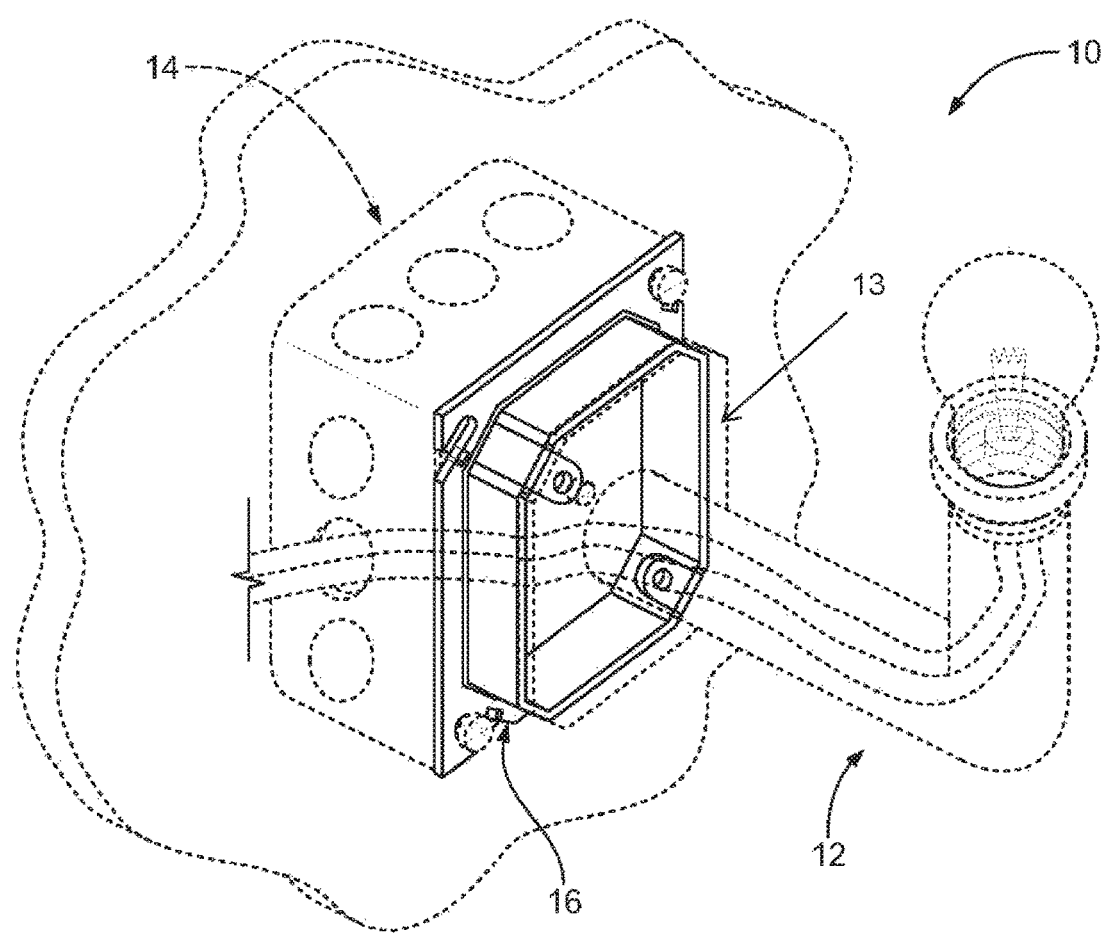
FIG. 1A is a perspective view of an electrical junction box with adapter installed into a wall.
Figure 1B:
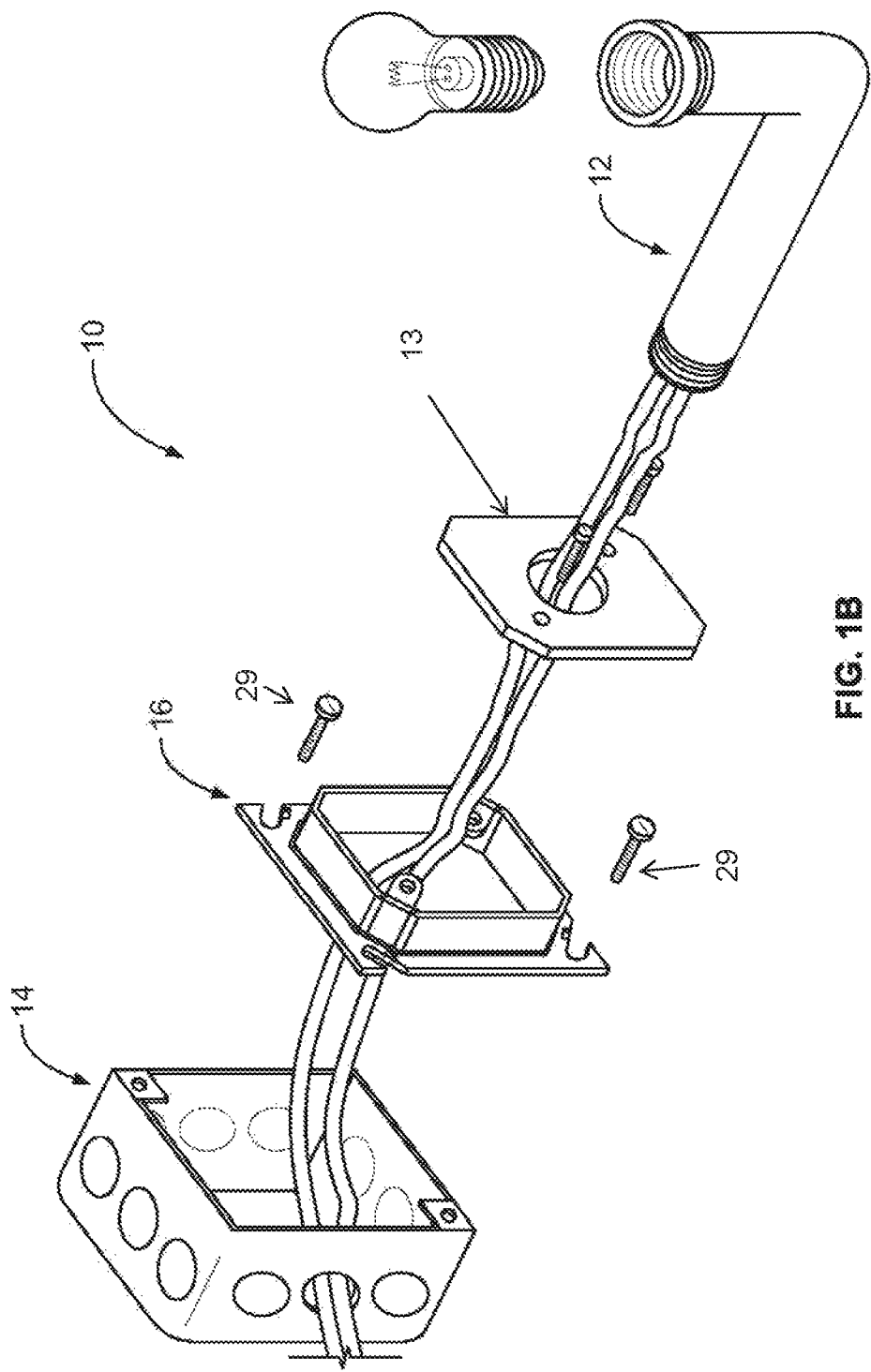
FIG. 1B is an exploded perspective view of an electrical junction box with adapter.

With reference to the drawings, FIG. 1A and FIG. 1B represent an adapter system 10 for adapting an electrical device 12 having a mounting configured for a first type of electrical junction box and adapting it to couple to a second type of electrical junction box 14. FIG. 1A depicts adapter system 10 installed into a wall, while FIG. 1B depicts an exploded view of the adapter system 10. Adapter system 10 minimally comprises a square electrical junction box 14, a square to octagon adapter 16 coupled to the electrical junction box 14, and an electrical device 12 having an octagon shaped or round shaped mounting plate 13 coupled the square to octagon adapter 16. In some embodiments, as shown in FIG. 1B, the square to octagon adapter may be coupled to the electrical junction box 14 through common fasteners 29. The electrical device 12 for example may include but not be limited to a lighting fixture, a thermostat, a smoke or CO detector, or any other electrical device that is designed to mount to a round or octagonal electrical junction box.

Figure 2:
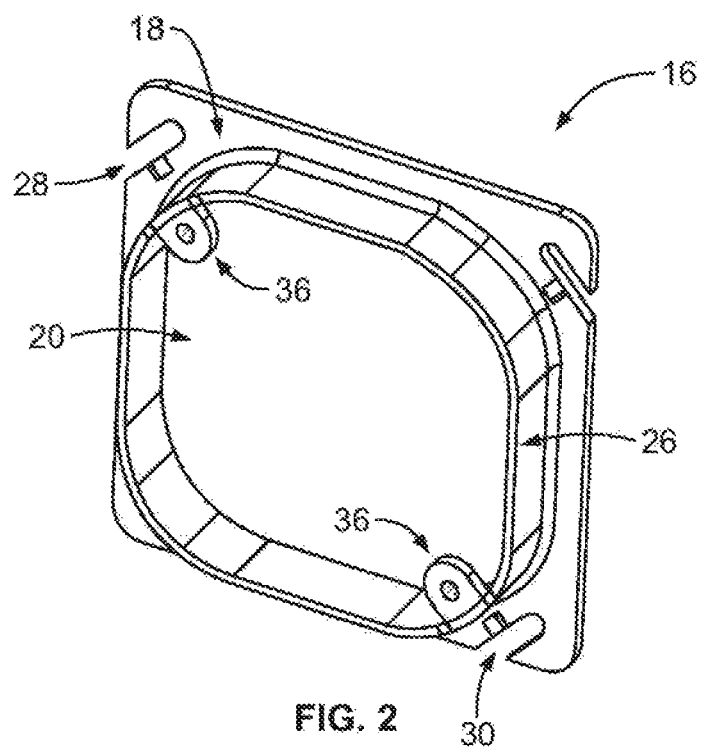
FIG. 2 is a perspective view of an embodiment of an adapter in accordance with the present invention.
Figure 3:
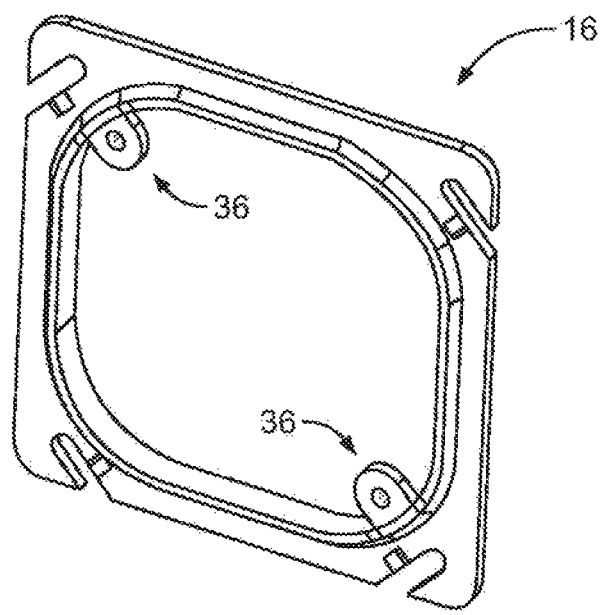
FIG. 3 is a perspective view of another embodiment of an adapter in accordance with the present invention.

FIG. 2 and FIG. 3 represent example embodiments of the square to octagon adapter 16. The square to octagon adapter 16 comprises a generally square baseplate 18 having an octagonal shaped opening 20, and a means to accommodate coupling to the electrical junction box 28, 30. The baseplate 18 additionally comprises a front surface 19 and a rear surface 21.

In one embodiment, the octagonal shaped opening 20 is configured such that at least four sides of the octagonal shaped opening 20 run parallel to the four sides of the outer perimeter of the baseplate 18. The octagonal shaped opening 20 may further be configured to have all eight sides of the octagonal shaped opening 20 comprise equal lengths. Alternatively, the octagonal shaped opening 20 may be configured to have adjacent sides alternating between a first length and a second length wherein the first length is longer than the second length. In this alternative representation, the sides of the octagonal shaped opening 20 with the first length may be configured to run parallel with respective sides of the outer perimeter of the baseplate to maximize the total open area of the octagonal shaped opening 20. The maximized area gives the installer a larger opening than a traditional round adapter, and thus makes it easier to route wires to and from the junction box. In some embodiments, the baseplate 18 additionally comprises a wall 26 projecting normal to the baseplate 18 and at least partially surrounding the perimeter octagonal shaped opening 20. The wall 26 helps to provide additional support and stability for coupled electrical devices 12.

The outer dimensions of the baseplate 18 and octagonal shaped opening 20 vary depending upon the electrical junction box currently installed. By way of example and not meant to be limiting, the baseplate 18 may be dimensioned to accommodate standard square junction boxes sizes such as 4", 4¹¹⁄₁₆", and 6" and octagonal shaped openings 20 may be dimensioned to emulate an octagon junction box of 3½" or 4". In embodiments that comprise the additional support wall 26, the height dimension of the support wall 26 may also vary depending on the electrical device 12 to be installed. By way of example and not meant to be limiting, a standard height may be about ⅝".

In order to couple the square to octagon adapter 16 to the electrical junction box 14, the baseplate 16 additionally comprises electrical junction box coupling means 22. In one embodiment, at least two angled open ended slots 28, 30 disposed in opposite diagonal corners from each other are configured to accommodate a screw or mechanically similar mating mechanism. In one configuration, the respective slots 28, 30 run parallel to each other and both have open ends extending through adjacent sides of the baseplate 18 perimeter. In this configuration an installer may slide the slots 28, 30 of square to octagon adapter plate 16 around screws that are partially tightened into junction box 14 and tighten then tighten the screws to fix or couple the adapter 16 in place. In another configuration, the respective slots 28, 30 run parallel to each other and both have open ends extending through opposite sides of the baseplate 18 perimeter. In this configuration an installer may rotate square to octagon adapter plate 16 such that the slots 28, 30 rotate around screws that are partially tightened into junction box 14 and tighten then tighten the screws to fix or couple the adapter 16 in place. In other embodiments, electrical junction box coupling means 22 may comprise holes instead of slots, or at least one hole and one slot.

In another embodiment, the baseplate 18 may have slots in either configuration as described above in all four corners of the baseplate 18. Having slots located in all four corners gives optimal flexibility to the installer as it allows for greater compatibility with existing square junction box coupling feature locations, and allows the installer couple the adapter 16 in four different rotational states as well allowing the installer to couple the adapter 16 through either the front surface 19 or rear surface 21 of the baseplate 18. The ability to couple the adapter 16 via the front surface 19 or rear surface 21 gives the installer the ability to better accommodate the existing position of the junction box 14 in relation to the drywall. If the junction box 14 is deeper into the drywall, it may be pertinent to couple the adapter 16 such that the rear surface 21 is in contact with the junction box 14 so that the support wall 26 extends out towards the drywall and the fixture or electrical device 12 is placed at the proper depth. Alternatively, if the existing junction box 14 is flush with the drywall, it may be pertinent to couple the adapter 16 such that the front surface 21 is in contact with the junction box 14 so that the support wall 26 extends into the junction box 14 and the fixture or electrical device 12 is placed at the proper depth.

Figure 4:
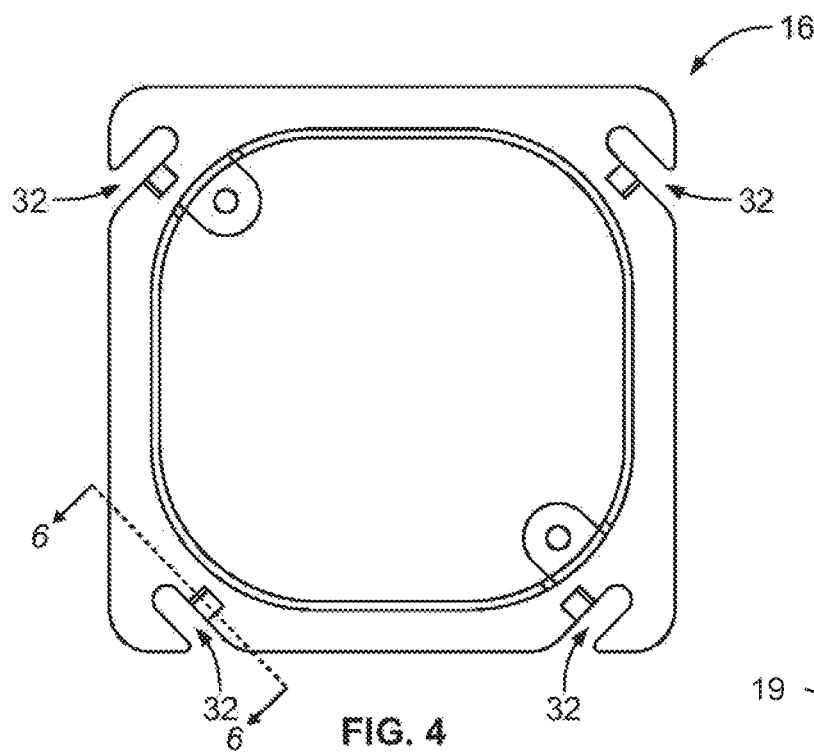
FIG. 4 is a top view of yet another embodiment of an adapter in accordance with the present invention.
Figure 6:
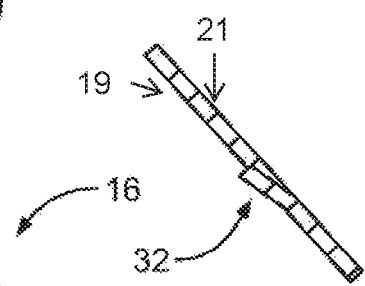
FIG. 6 is a cross-section view of through line 6-6 of FIG. 4.
Figure 5:
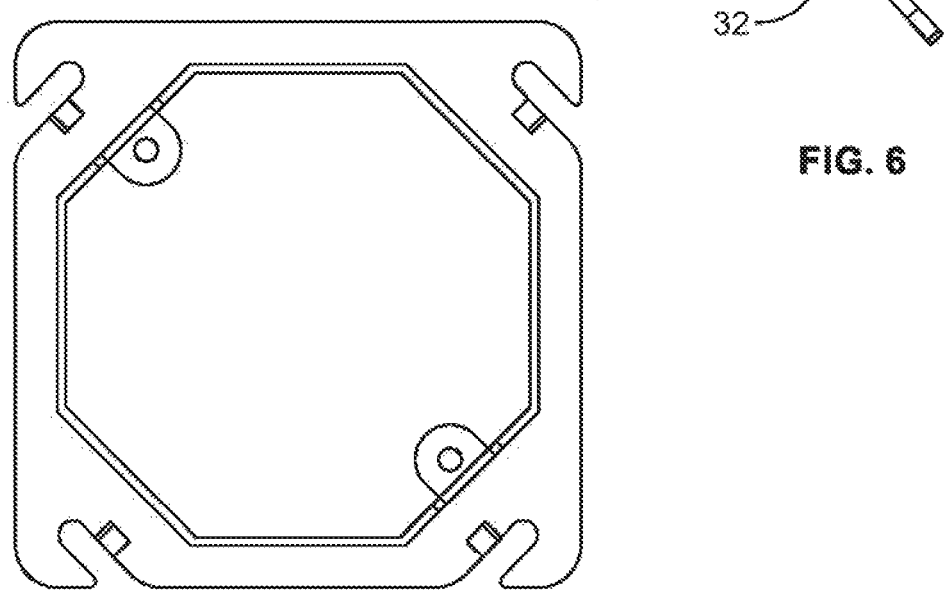
FIG. 5 is a top view of still another embodiment of an adapter in accordance with the present invention.

As shown in FIG. 4 and detailed in the cross-section shown FIG. 6, the baseplate 18 in some embodiments may comprise locking features 32 designed to prevent tightened screws mating the adapter 16 to the junction box 14 from backing out. The locking features 32 in one configuration comprise tabs 32 located adjacent to the slots 28, 30 such that the tabs 32 will be at least partially covered and compressed by a coupling screw extending through the slots 28, 30. As shown in FIG. 3C the tabs 32 are configured to extend slightly above either the front or rear surface such that when a screw head is tightened the tabs 32 are compressed into the baseplate 18 and provide a return compressive force on the screw head. In this configuration, the tabs 32 act as locking washer using a return compressive force to hold the screws in place.

In order to couple an electrical device 12 to the square to octagon adapter 16, the square to octagon adapter 16 further comprises an electrical device coupling means 24. In one embodiment the electrical device coupling means 24 comprises at least two flanges 36 extending from the baseplate 18 into the octagonal shaped opening 20 from opposite sides of the octagonal shaped opening 20. In one configuration of this embodiment, the at least two flanges 36 extend from opposite sides of the octagonal shaped opening 20 wherein the opposite sides are located in opposite corners of the baseplate 18. In another embodiment, the at least two flanges 36 extend from the support wall 26 normal into the octagonal shaped opening 20. The at least two flanges 36 are configured to receive screws or similar mechanical mating mechanisms to accommodate a complimentary mounting plate or electrical device 12.

The components of such as the square to octagon adapter 16 may be comprised of standard materials in the industry including but not limited to metals such as steel, G60 steel, cold rolled steel, stainless steel, or galvanized steel, aluminum or polymers such as ABS, fiberglass, polycarbonate or polystyrene.

In yet another aspect of the invention, a method for adapting a square electrical junction box 14 to a round or octagonal electrical device 12 is described. One method includes the steps of identifying a square junction box 14, identifying an electrical device 12 to be installed, coupling a square to octagon adapter 16 to the electrical junction box 14, extending electrical wires from the electrical junction box 14 through an octagonal shaped opening 12 of the square to octagon adapter 16, coupling the electrical wires to the electrical device 12, coupling the electrical device 12 directly to the square to octagon adapter 16 or coupling a mounting plate of the electrical device 12 directly to the square to octagon adapter 16. Or in the alternative, the method includes the steps of identifying a square junction box 14, identifying an electrical device 12 to be installed, coupling the electrical device 12 directly to a square to octagon adapter 16 or coupling a mounting plate of the electrical device 12 directly to the square to octagon adapter 16, coupling the electrical wires to the electrical device 12, coupling the square to octagon adapter plate 16 to the junction box 14. Or in yet another alternative, the method includes steps of identifying a square junction box 14, identifying an electrical device 12 to be installed, coupling the electrical wires to the electrical device 12, coupling the electrical device 12 directly to a square to octagon adapter 16 or coupling a mounting plate of the electrical device 12 directly to the square to octagon adapter 16, coupling the square to octagon adapter plate 16 to the junction box 14.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A square shaped junction box opening to octagon shaped junction box opening adapter for a square shaped electrical junction box comprising:
   a square shaped baseplate having a front surface and rear surface;
   the square shaped baseplate further having an octagonal shaped opening bound by a perimeter of the square shaped baseplate;
   the square shaped baseplate further having at least two baseplate fastener openings disposed in opposite corners of the square shaped baseplate configured to accommodate screw fasteners to couple the adapter to the square shaped electrical junction box;
   the square shaped baseplate further having at least one locking feature disposed adjacent to at least one of the at least two baseplate fastener openings, the locking feature comprising a tab extending above the front surface of the square shaped base plate or extending below the rear surface of the square shaped base plate wherein when the tab is compressed by a head of the screw fastener, the tab provides a return compressive force onto the head of the screw fastener preventing the screw fastener from backing out of the at least one of the at least two baseplate fastener openings; and
   the square shaped baseplate further having at least two flange members extending from the square shaped baseplate into the octagonal shaped opening, each of said two flange members having flange openings to accommodate a second fastener to couple an electrical device or fixture to the adapter.

2. The square shaped junction box opening to octagon shaped junction box opening adapter of claim 1 wherein the octagonal shaped opening has four sides that run parallel to four sides of the perimeter of the square shaped baseplate.

3. The square shaped junction box opening to octagon shaped junction box opening adapter of claim 2 wherein the octagonal shaped opening has adjacent sides alternating between a first length and a second length wherein the first length is longer than the second length.

4. The square shaped junction box opening to octagon shaped junction box opening adapter of claim 3 wherein a side of the octagonal shaped opening of the first length runs parallel to the perimeter of the square shaped baseplate.

5. The square shaped junction box opening to octagon shaped junction box opening adapter of claim 4 wherein octagonal shaped opening is dimensioned to emulate an opening of a 3½"-4" octagon junction box.

6. The square shaped junction box opening to octagon shaped junction box opening adapter of claim 1 wherein the square shaped baseplate additionally comprises a wall projecting normal to the square shaped baseplate and at least partially surrounding a perimeter of the octagonal shaped opening.

7. The square shaped junction box opening to octagon shaped junction box opening adapter of claim 6 wherein the at least two flange members extend normal from the wall into the octagonal shaped opening.

8. The square shaped junction box opening to octagon shaped junction box opening adapter of claim 7 wherein the wall has a height of ⅝".

9. The square shaped junction box opening to octagon shaped junction box opening adapter of claim 1 wherein the at least two openings comprise parallel angled slots having openings in adjacent sides of the perimeter of the square shaped baseplate.

10. The square shaped junction box opening to octagon shaped junction box opening adapter of claim 9 further comprising at least two additional parallel angled slots disposed in corners adjacent to the at least two openings, the at least two additional parallel angled slots having openings in adjacent sides of the perimeter of the square shaped baseplate, the at least two additional parallel slots running normal to the parallel angled slots.

11. The square shaped junction box opening to octagon shaped junction box opening adapter of claim 1 wherein the at least two openings comprise parallel angled slots having openings in opposite sides of the perimeter of the square shaped baseplate.

12. The square shaped junction box opening to octagon shaped junction box opening adapter of claim 11 further comprising at least two additional parallel angled slots disposed in corners adjacent to the at least two openings, the at least two additional parallel angled slots having openings in opposite sides of the perimeter of the square shaped baseplate, the at least two additional parallel slots running normal to the parallel angled slots.

13. The square shaped junction box opening to octagon shaped junction box opening adapter of claim 1 wherein the square shaped junction box opening to octagon shaped junction box opening adapter is comprised of any one of the following materials: steel, G60 steel, cold rolled steel, stainless steel, or galvanized steel, aluminum, ABS, fiberglass, polycarbonate or polystyrene.

14. A system for adapting an electrical device or fixture having a round or octagon shaped mounting plate to a square shaped electrical junction box comprising:
 a square shaped electrical junction box;
 an electrical device or fixture having a round or octagon shaped mounting plate; and
 a square shaped junction box opening to octagon shaped junction box opening adapter comprising a square shaped baseplate having a front surface and rear surface, the square shaped baseplate further having an octagonal shaped opening bound by a perimeter of the square shaped baseplate, the square shaped baseplate further having at least two baseplate fastener openings disposed in opposite corners of the square shaped baseplate configured to accommodate fasteners to couple the square shaped junction box opening to octagon shaped junction box opening adapter to the square electrical junction box, the square shaped baseplate further having at least one locking feature disposed adjacent to at least one of the at least two baseplate fastener openings, the locking feature comprising a tab extending above the front surface of the square shaped base plate or extending below the rear surface of the square shaped base plate wherein when the tab is compressed by a head of the screw fastener, the tab provides a return compressive force onto the head of the screw fastener preventing the screw fastener from backing out of the at least one of the at least two baseplate fastener openings, and the square shaped baseplate further having at least two flange members extending from the square shaped baseplate into the octagonal shaped opening, each of said two flange members having flange openings to accommodate a second fasteners to couple the electrical device or fixture to the adapter.

15. A method for adapting a square shaped electrical junction box to an electrical device or fixture having a round shaped or octagon shaped mounting plate comprising the steps of:
 identifying a square electrical junction box;
 identifying an electrical device or fixture having a round shaped or octagon shaped mounting plate;
 identifying a square shaped junction box opening to octagon shaped junction box opening adapter comprising a square shaped baseplate having a front surface and rear surface, the square shaped baseplate further having an octagonal shaped opening bound by a perimeter of the square shaped baseplate, the square shaped baseplate further having at least two baseplate fastener openings disposed in opposite corners of the square shaped baseplate configured to accommodate screw fasteners to couple the square shaped junction box opening to octagon shaped junction box opening adapter to the square shaped electrical junction box, the square shaped baseplate further having at least one locking feature disposed adjacent to at least one of the at least two openings, the locking feature comprising a tab extending above the front surface of the square shaped base plate or extending below the rear surface of the square shaped base plate wherein when the tab is compressed by a head of the screw fastener, the tab provides a return compressive force onto the head of the screw fastener preventing the screw fastener from backing out of the at least one of the at least two openings, the square shaped baseplate further having at least two flange members extend from the square shaped baseplate into the octagonal shaped opening, each of said two flange members having flange openings to accommodate a second fastener to couple an electrical device or fixture to the square shaped junction box opening to octagon shaped junction box opening adapter;
 coupling the adapter to the square electrical junction box by inserting a screw fastener into at least one of the at least two baseplate fastener openings and compressing the tab;
 extending electrical wires from the square electrical junction box through an octagonal shaped opening of the square shaped junction box opening to octagon shaped junction box opening adapter;

electrically coupling the electrical wires to the electrical device or fixture configured to be mounted to a round or octagon electrical junction; and coupling the electrical device or fixture configured to be mounted to a round or octagon electrical junction to the at least two flange members of the square shaped junction box opening to octagon shaped junction box opening adapter extending into the octagonal shaped opening of the square shaped junction box opening to octagon shaped junction box opening adapter.

16. The method of claim 15 wherein the step of coupling the square shaped junction box opening to octagon shaped junction box opening adapter to the square electrical junction box is performed after the step of coupling the electrical device or fixture configured to be mounted to a round or octagon electrical junction to flange members.

* * * * *

UNITED STATES PATENT AND TRADEMARK OFFICE
CERTIFICATE OF CORRECTION

| | | |
|---|---|---|
| PATENT NO. | : 10,027,099 B1 | Page 1 of 1 |
| APPLICATION NO. | : 15/410484 | |
| DATED | : July 17, 2018 | |
| INVENTOR(S) | : Garvin et al. | |

It is certified that error appears in the above-identified patent and that said Letters Patent is hereby corrected as shown below:

On the Title Page

"(72) Inventor: Barton L. Garvin, Western Springs, IL (US)"
Should read:
--(72) Inventors: Barton L. Garvin, Western Springs, IL (US);
                David D. Miller, Grafton, OH (US)--

Signed and Sealed this
Third Day of November, 2020

Andrei Iancu
*Director of the United States Patent and Trademark Office*